US009083438B2

(12) United States Patent
Tsai et al.

(10) Patent No.: US 9,083,438 B2
(45) Date of Patent: Jul. 14, 2015

(54) CARD CONNECTOR AND ELECTRONIC APPARATUS

(71) Applicant: HTC Corporation, Taoyuan County (TW)

(72) Inventors: Yuh-Huei Tsai, Taoyuan County (TW); San-Chi Ho, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 89 days.

(21) Appl. No.: 13/922,262

(22) Filed: Jun. 20, 2013

(65) Prior Publication Data

US 2014/0377976 A1 Dec. 25, 2014

(51) Int. Cl.

| | |
|---|---|
| ***H01R 13/62*** | (2006.01) |
| ***H04B 1/38*** | (2015.01) |
| ***G06K 7/00*** | (2006.01) |
| ***G06K 13/08*** | (2006.01) |

(52) U.S. Cl.

CPC ................ *H04B 1/38* (2013.01); *G06K 7/0069* (2013.01); *G06K 13/08* (2013.01); *G06K 13/0831* (2013.01)

(58) Field of Classification Search

CPC .... G06K 13/08; G06K 7/0021; H05K 5/0269
USPC ........................... 439/159, 630, 946; 361/737
See application file for complete search history.

(56) References Cited

U.S. PATENT DOCUMENTS

| | | | | |
|---|---|---|---|---|
| 6,561,851 | B2 | 5/2003 | Florescu | |
| 8,147,262 | B1 * | 4/2012 | Su et al. | 439/159 |
| 8,337,223 | B2 * | 12/2012 | Gao et al. | 439/159 |
| 8,371,865 | B1 * | 2/2013 | Su | 439/155 |
| 8,419,454 | B1 * | 4/2013 | Ji et al. | 439/159 |
| 8,579,640 | B2 * | 11/2013 | Ho | 439/159 |
| 8,740,635 | B2 * | 6/2014 | Lim et al. | 439/159 |
| 2012/0083145 | A1 | 4/2012 | Gao et al. | |

FOREIGN PATENT DOCUMENTS

| | | |
|---|---|---|
| TW | M416221 | 11/2011 |
| TW | M454643 | 6/2013 |

OTHER PUBLICATIONS

"Office Action of Taiwan Counterpart Application," issued on Apr. 20, 2015, p1-p5, in which the listed references were cited.

* cited by examiner

*Primary Examiner* — Thanh Tam Le
(74) *Attorney, Agent, or Firm* — Jianq Chyun IP Office

(57) ABSTRACT

A card connector configured in a circuit board for accommodating a subscriber identify module card. The card connector includes a terminal set, a sensing terminal, a housing, and a tray. The subscriber module card is electrically connected to the circuit board via the terminal set. The sensing terminal is electrically connected to the circuit board. The housing has an opening and an accommodating space connected to the opening, and the housing is electrically connected to the circuit board. At least a portion of the tray is a conductor. When the tray is configured in the accommodating space via the opening, the tray is electrically connected to the housing, and the tray abuts the sensing terminal, allowing the housing, tray, sensing terminal to constitute a conductive loop with the circuit board. Furthermore, an electronic apparatus having the card connector is also disclosed.

10 Claims, 9 Drawing Sheets

146 140 100 142a 142 142b 144 150a 154 158 152 152 156 150 105 164a 164c 164b 164 130 122a 122 122b 162b 162 162a 122 122 120 110

CARD CONNECTOR AND ELECTRONIC APPARATUS

BACKGROUND OF THE INVENTION

1. Field of the Invention

The application relates to a card connector, more particularly to a card connector having a tray.

2. Description of Related Art

With the increasing development in wireless transmission technologies, all kinds of handheld electronic products are produced. One of the most common and versatile electronic products is the mobile communication apparatus. In a mobile telephone communication system, a mobile phone number generally corresponds to a subscriber identify module (SIM) card. As soon as a mobile phone user combines the SIM card with the mobile phone, the system is immediately able to identify the user, provides all kinds of transmission services and trace calling data for billing purposes. For the past few years, with the popularity of 3G network, a mobile phone is further able to provide entertaining functions such as surfing the Internet via a SIM card.

In order to connect a SIM card with a mobile phone, normally a card connector is configured within the mobile phone as an interface for connection. Currently, card connectors that are commonly seen can be divided into the following types based on the way the card is drawn, including push-push type, push-pull type, tray type, and so on. Within a tray-type SIM card connector, the SIM card is placed on a tray which is then configured to the card connector. Normally, a sensing terminal and a sensing pad are configured at the end inside the card connector. When the card is configured in the card connector and the tray abuts the end of the card connector, the tray abuts the sensing terminal so as to push the sensing terminal to abut the sensing pad such that the sensing terminal is electrically conducted with a circuit board via the sensing pad, which is a mechanism for determining whether the card is fully inserted into the card connector.

However, the structure applied in the mechanism by which the tray is configured in the card connector to push the sensing terminal to abut the sensing pad has a greater accumulation of tolerance, which is likely to cause the sensing terminal unable to abut the sensing pad, or an insufficient contact force between the sensing terminal and the abutted sensing pad will cause resistance to increase, making it is impossible to detect. In addition, when the handheld electronic apparatus bears a bending moment, the tray is unable to push the sensing terminal to abut the sensing pad.

SUMMARY OF THE INVENTION

The application provides a card connector, which may prevent the situation where the accumulation of tolerance causes the sensing terminal unable to detect when the tray is configured in the card connector.

The application provides an electronic apparatus having the aforementioned card connector.

In the application, the card connector is configured in a circuit board for accommodating a subscriber identify module (SIM) card. The card connector includes a terminal set, a sensing terminal, a housing, and a tray. The SIM card is electrically connected to the circuit board via the terminal set. The sensing terminal is electrically connected to the circuit board. The housing has an opening and an accommodating space connected to the opening, and is also electrically connected to the circuit board. At least a portion of the tray is a conductor. When being configured in the accommodating space via the opening, the tray is electrically connected to the housing and abuts the sensing terminal, allowing the housing, tray, sensing terminal to constitute a conductive loop with the circuit board.

In the application, the electronic apparatus is adaptable for being electrically connected to the SIM card. The electronic apparatus includes a circuit board and a card connector. The circuit board is electrically connected to the SIM card. The card connector is configured in the circuit board for accommodating the SIM card. The card connector includes a terminal set, a sensing terminal, a housing, and a tray. The SIM card is electrically connected to the circuit board via the terminal set. The sensing terminal is electrically connected to the circuit board. The housing has an opening and an accommodating space connected to the opening and is electrically connected to the circuit board. At least a portion of the tray is a conductor. When being configured in the accommodating space via the opening, the tray is electrically connected to the housing and abuts the sensing terminal, allowing the housing, tray, sensing terminal to constitute a conductive loop with the circuit board.

Based on the above, in the application, the sensing terminal of the card connector is electrically connected to the circuit board via the housing, and a pin of the housing is electrically connected to the circuit board. When the SIM card is placed on the tray and configured in the card connector, the tray is able to abut the sensing terminal, allowing the housing, tray, sensing terminal to constitute a conductive loop with the circuit board so as to detect whether a card is configured in the card connector.

In order to make the aforementioned features and advantages of the application more comprehensible, embodiments accompanying figures are described in detail below.

DESCRIPTION OF EMBODIMENTS

Figure 1A:
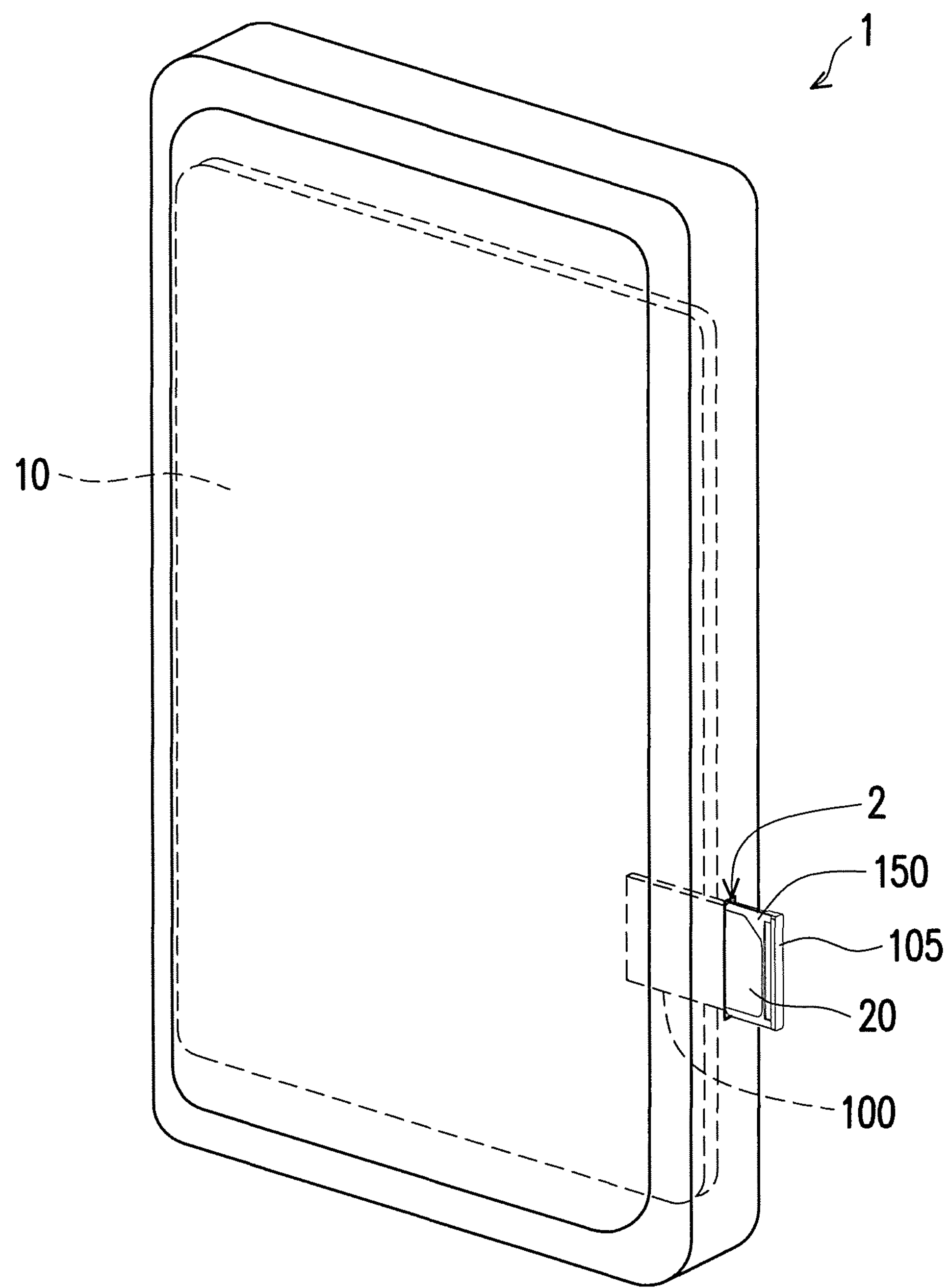
FIG. 1A is a schematic view illustrating an electronic apparatus in an embodiment of the application.
Figure 1B:
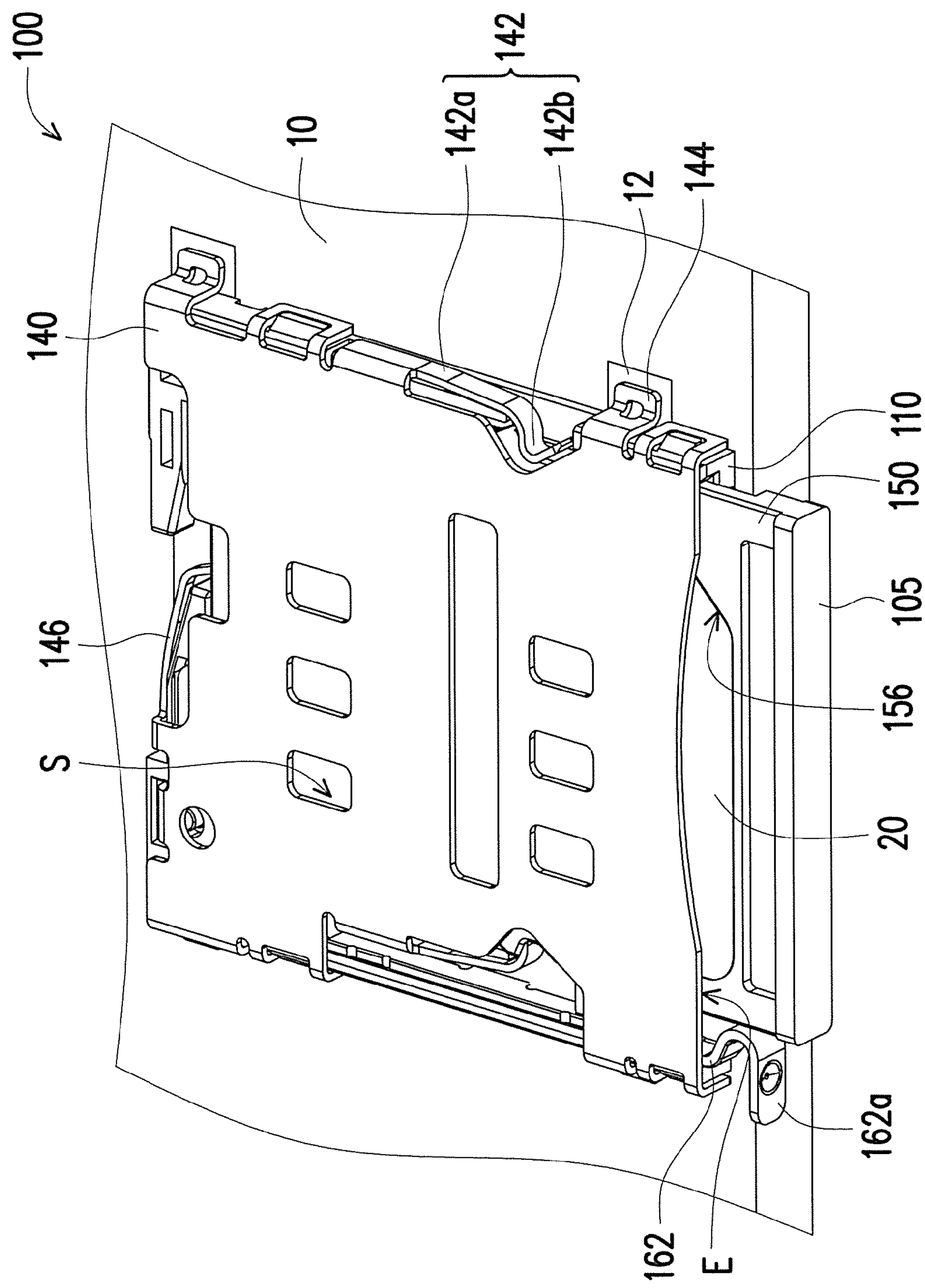
FIG. 1B is a schematic view illustrating a card connector in an embodiment of the application.
Figure 1C:
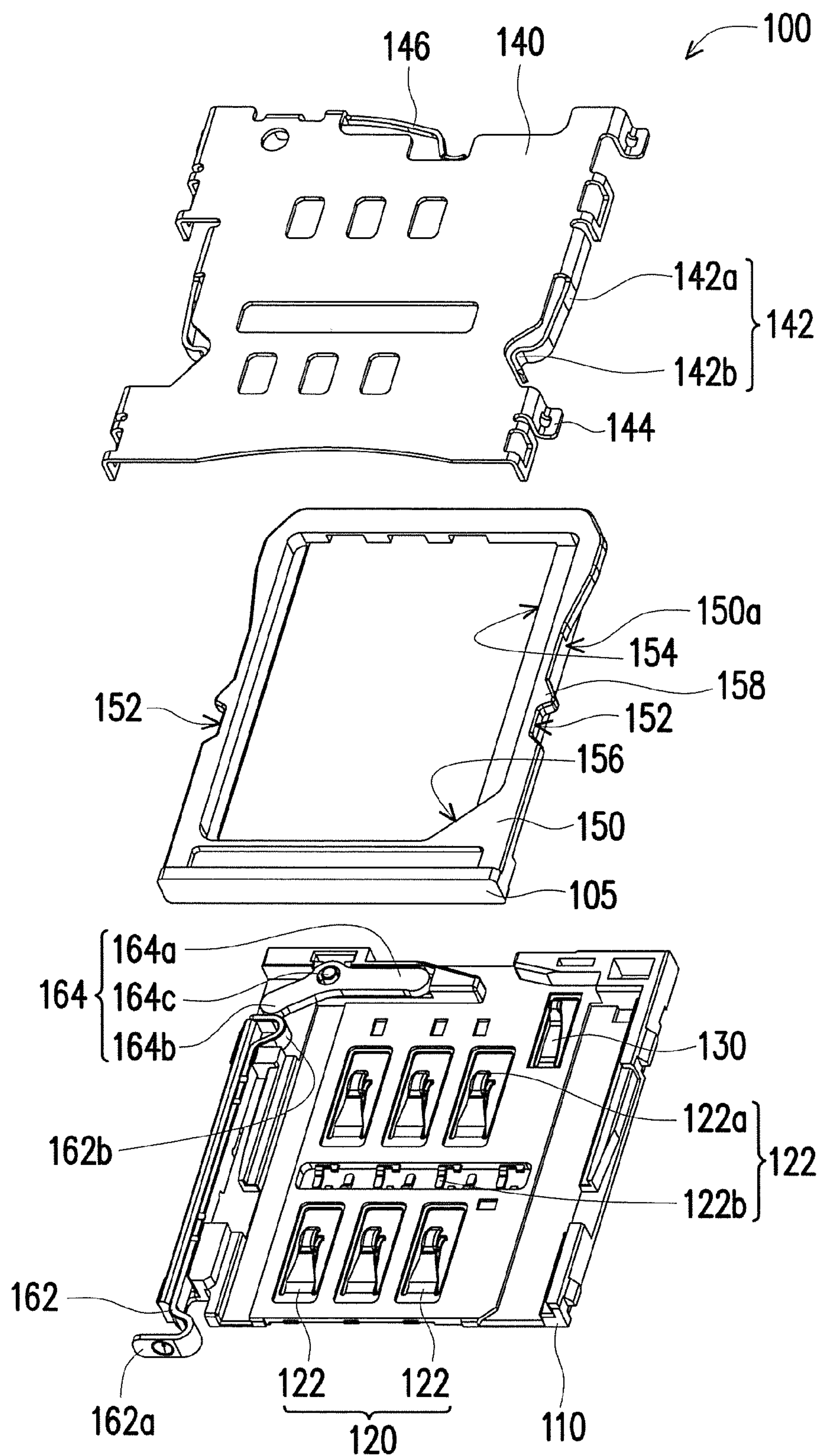
FIG. 1C is an explosive view illustrating the card connector in FIG. 1B.

FIG. 1A is a schematic view illustrating an electronic apparatus in an embodiment of the application. FIG. 1B is a schematic view illustrating a card connector in FIG. 1A. FIG. 1C is an explosive view illustrating the card connector in FIG. 1B. Please refer to FIGS. 1A-1C. In this embodiment, an electronic apparatus 1 is adaptable for being electrically connected to a subscriber identify module (SIM) card 20. The electronic apparatus 1 includes a circuit board 10 and a card connector 100. The circuit board 10 is electrically connected to the SIM card 20. The card connector 100 is configured in the circuit board 10 for accommodating the SIM card 20. The card connector 100 includes a terminal set 120, a sensing terminal 130, a housing 140, and a tray 150.

The SIM card 20 is electrically connected to the circuit board 10 via the terminal set 120. The sensing terminal 130 is electrically connected to the circuit board 10. The housing 140 has an opening E and an accommodating space S connected to the opening E, and is electrically connected to the circuit board 10. In this embodiment, at least a portion of the housing 140 and the tray 150 is a conductor which is, for example, formed of a metal material. The metal material allows the tray 150 to be conducted with and electrically connected to the circuit board 10 via the housing 140. Specifically, the main body of the tray may be a non-conductor, such as plastic. Then, the metal is plated at a portion which is to be electrically connected to by the means of electroplating so that the portion can be conducted. When the tray 150 is configured in the accommodating space S via the opening E, the tray 150 is electrically connected to the housing 140; the tray 150 abuts the sensing terminal 130, allowing the housing 140, tray 150, and sensing terminal 130 to constitute a conductive loop with the circuit board 10.

Figure 2A:
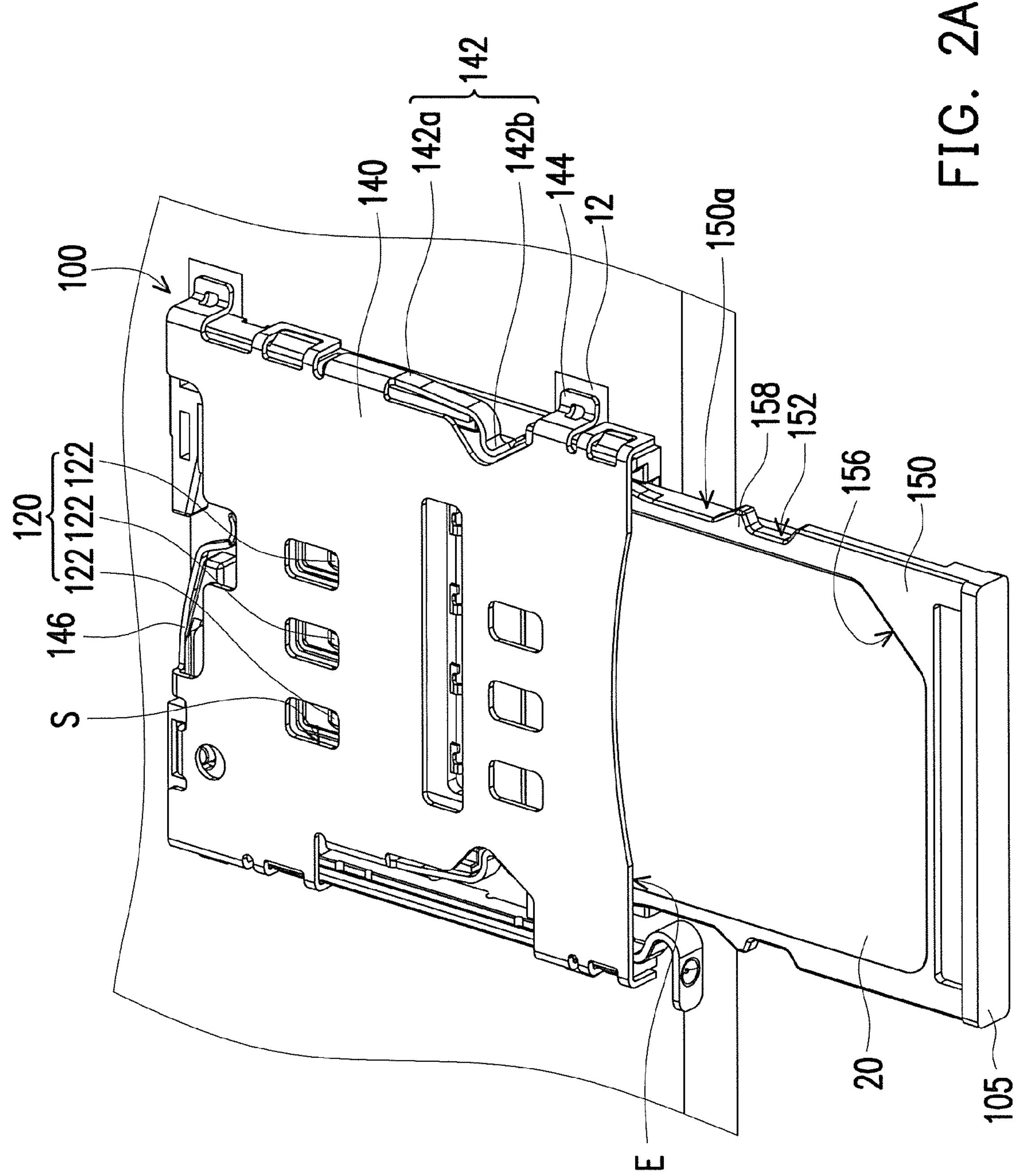
FIG. 2A is a schematic view illustrating a tray before being configured in the card connector in FIG. 1B.
Figure 2B:
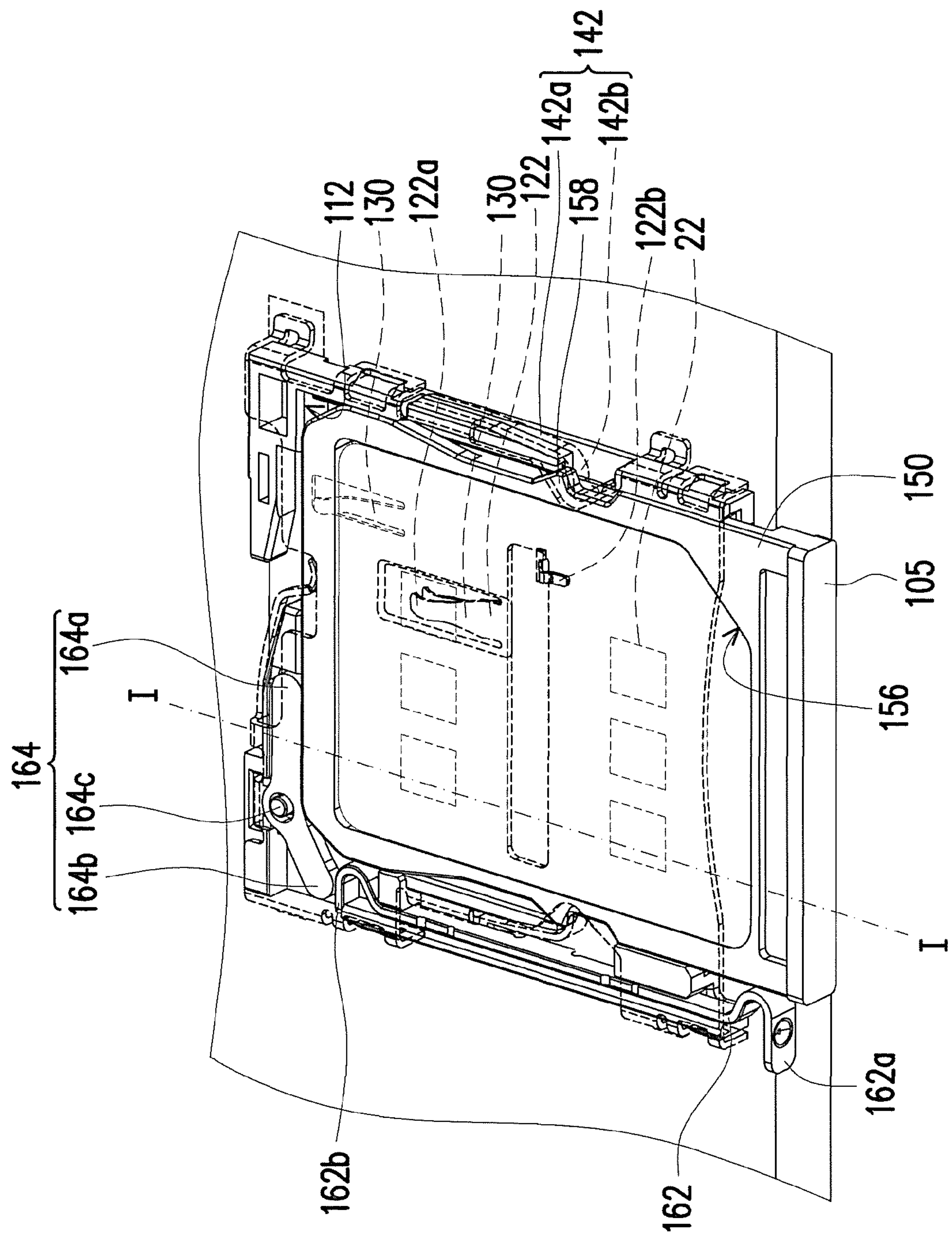
FIG. 2B is a schematic view illustrating the tray after being configured in the card connector in FIG. 2A.

FIG. 2A is a schematic view illustrating the tray in FIG. 1B before being configured in the card connector. FIG. 2B is a schematic view illustrating the tray in FIG. 2A after being configured in the card connector. Please refer to FIGS. 2A and 2B. In order to show the inner structure of the card connector 100 clearly, in FIG. 2B, the SIM card 20, the sensing terminal 130, the housing 140, and the tray 150 are shown in a transparent manner. In this embodiment, the card connector 100 further includes an insulating base 110, which is configured on the circuit board 10. The terminal set 120 and the sensing terminal 130 are fixed in the insulating base 110, and the sensing terminal 130 is configured in the insulating base 110 and electrically connected to the circuit board 10. The housing 140 further includes at least one locking element 142 and at least one pin 144 (four pins are shown in the figure). The pin 144 is electrically connected to the circuit board 10. For example, in the circuit board 10, a plurality of pads 12 are configured at a position corresponding to the pin 144. The card connector 100 allows the pin 144 to be fixed on the pads 12 via a solder paste so as to electrically connect to the circuit board 10 by the means of surface-mount technology (SMT). In addition, a side of the tray 150 has at least one depressed portion 152 (two depressed portions are shown in the figure). The card connector 100 is locked to the depressed portion 152 so as to fix the tray 150 via the locking element 142.

In other words, when the SIM card 20 is placed on the tray 150 and configured in the card connector 100 (as shown in FIG. 2B), the tray 150 is configured in the accommodating space S via the opening E. The locking element 142 is locked to the depressed portion 152 so as to fix the tray 150, and the tray 150 passes over the sensing terminal 130 and abuts the sensing terminal 130, allowing the housing 140, tray 150, sensing terminal 130 to constitute a conductive loop with the circuit board 10. Therefore, in this embodiment, the tray 150 in the card connector 100 can directly abut the sensing terminal 130 to electrically connect to the circuit board 10 without configuring an additional sensing point in the card connector 100. Accordingly, not only the problem that the accumulation of tolerance causes the sensing terminal 130 unable to detect whether the tray 150 is configured in the card connector 100 can be addressed, it can also prevent the handheld electronic apparatus from being deformed due to an external force (such as a bending moment) to cause the tray 150 to separate from the sensing terminal 130 in the card connector 100.

Figure 2C:
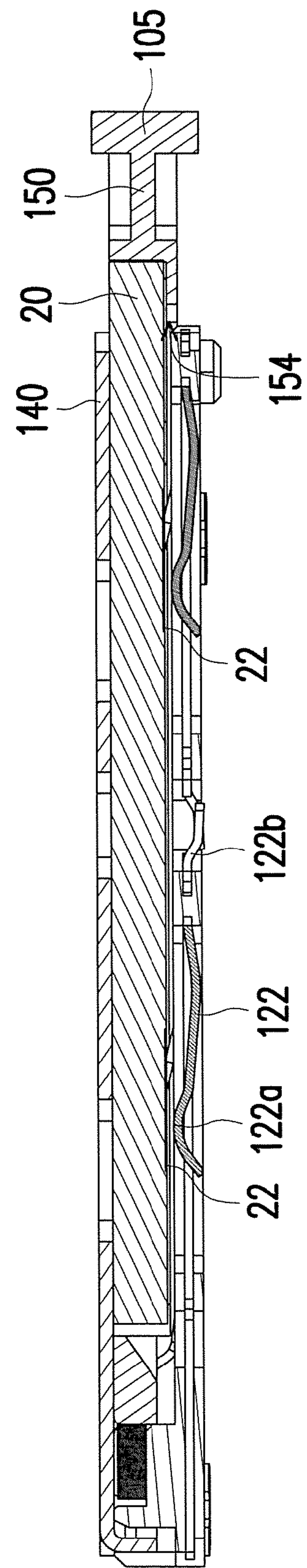
FIG. 2C is a cross-sectional view along I-I line in FIG. 2B.

FIG. 2C is a cross-sectional view along I-I line in FIG. 2B. Please also refer to FIGS. 2A-2C. In this embodiment, the SIM card 20 has a plurality of connecting points 22, the terminal set 120 includes a plurality of terminals 122 (six terminals are illustrated in the figure). When the SIM card 20 is on the tray 150 and configured in the accommodating space S, an end 122*a* of the terminal 122 is exposed to the accommodating space S and abuts the connecting points 22. The other end 122*b* of the terminal 122 is electrically connected to the circuit board 10. The material of each terminal 122 is, for example, Be—Cu having excellent conductivity, which should not be construed as a limitation to the application. In addition, the tray 150 further includes a hollow region 154 (as shown in FIG. 1C). When the SIM card 20 is located in the tray 150, the connecting point 22 of the SIM card 20 faces toward the hollow region 154 at the bottom of the tray 150. When the tray 150 is configured in the accommodating space S, the terminal 122 may abut the connecting point 22 via the hollow region 154. The application does not limit that the tray 150 has the hollow region 154. In other embodiments of the application that are not shown, the card connector is a reverse type card connector. When it comes to a reverse type card connector, the insulating base faces the outer portion of the circuit board and the housing faces the circuit board, allowing the card connector to be configured on a lower surface of the circuit board based on the requirement of a design. In the card connector, the terminal set is configured in the housing, and the tray does not need the hollow region. When the SIM card is located in the tray, the connecting point of the SIM card faces toward the outer portion of the tray, the terminal can equally abut the connecting point when the tray is configured in the accommodating space.

At the bottom of the accommodating space S of the card connector 100, the insulating base 110 includes a stopping portion 112. When the tray 150 is located in a fixed position (as shown in FIG. 2B), the stopping portion 112 abuts the tray 150. The insulating base 110 may be formed of plastic material. The plastic material is, for example, fire-resistant liquid crystal polyester (LCP). The application does not limit the material of the insulating base 110. The housing 140 configured with the insulating base 110 and the tray 150 configured in the accommodating space S are formed of, for example, a metal material so as to have conductivity. In addition, the tray 150 further includes a positioning surface 156 thereon. The positioning surface 156 corresponds to a chip of the SIM card 20 so as to restrict the position where the SIM card 20 is placed on the tray 150, thereby preventing a user from placing the SIM card 20 in a wrong direction and causing damage to the card. In this embodiment, the positioning surface 156 may be a side wall of a cavity for accommodating the SIM card 20 in the tray 150, or may be a surface of a protruding point, which should not be construed as a limitation to the application.

In this embodiment, when the tray 150 is configured in the accommodating space S, a locking element 142 may be locked to a depressed portion 152 to fix the tray 150. The locking element 142 includes an arm portion 142*a* and an abutting portion 142*b*. The arm portion 142*a* is extended from the housing 140 in the form of, for example, a cantilever. An abutting portion 142*b* is connected to the arm portion 142*a*. In FIG. 1B, two locking elements 142 are shown. The abutting portion 142*b* is, for example, in a V-shaped appearance. When the tray 150 is configured in the accommodating space S, the abutting portion 142*b* abuts the depressed portion 152. In FIG. 2A, the tray 150 includes at least one depressed portion 152 (two depressed portions are illustrated in the figure). Moreover, a bump 158 is further included at one side of the depressed portion 152 distant from the positioning surface 156. When the tray 150 is moved from FIG. 2A to FIG. 2B relative to the card connector 100, the abutting portion 142*b* keeps abutting the side 150*a* of the tray 150. When the bump

158 of the tray 150 and abutting portion 142*b* of the locking element 142 abut each other, the abutting portion 142*b* is pushed by the bump 158 and ejected toward both sides of the card connector 100; meanwhile, the arm portion 142*a* may store elastic potential energy when the abutting portion 142*b* is ejected. When the abutting portion 142*b* deviates from the bump 158, the arm portion 142*a* releases the elastic potential energy such that the abutting portion 142*b* is locked within the depressed portion 152 so as to fix the position of the tray 150. The application does not limit that the tray 150 has the bump 158. In other embodiments of the application that are not shown, the side of the tray may be configured with the depressed portion only.

Figure 3A:
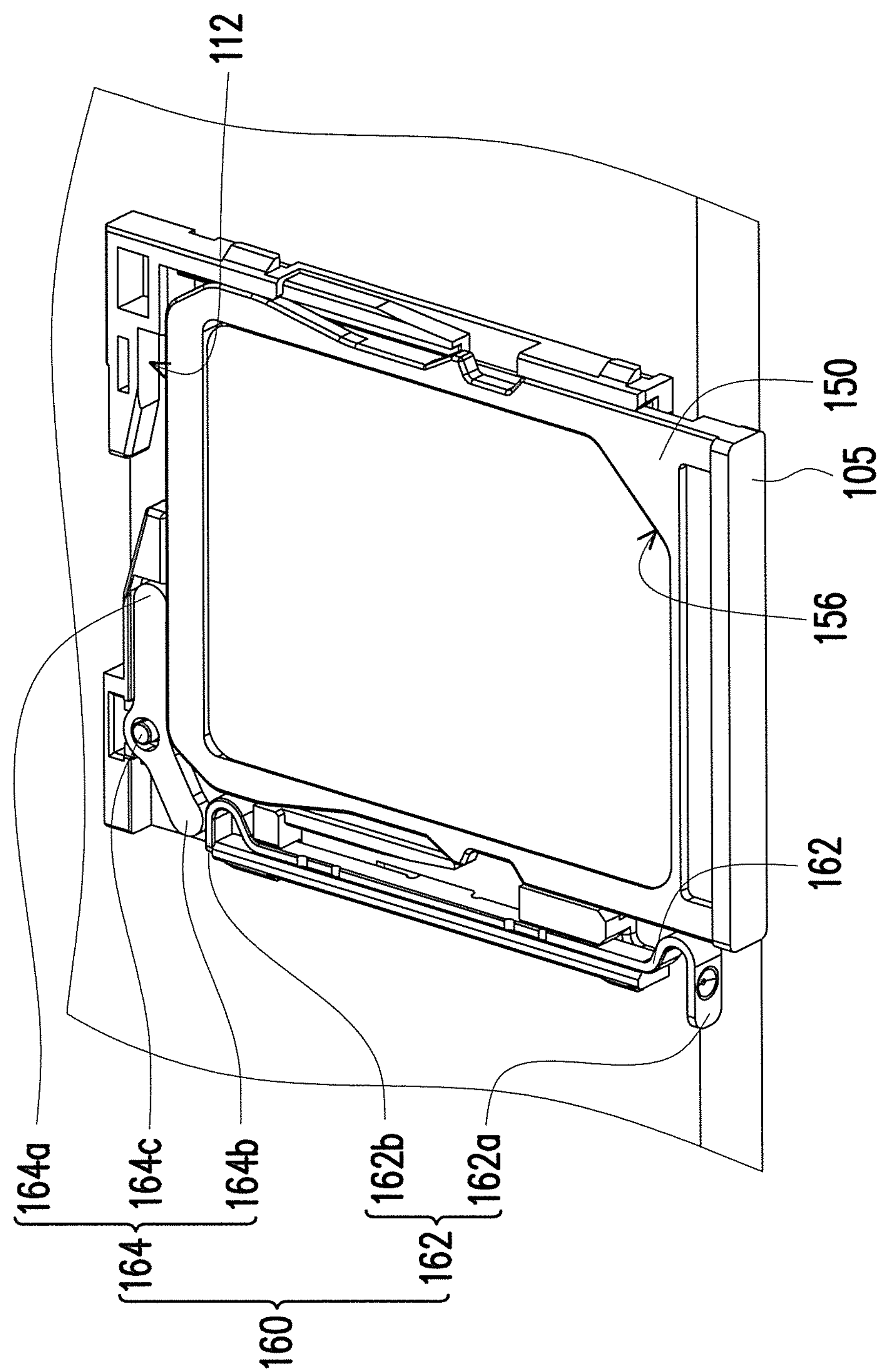
FIGS. 3A-3B are schematic views illustrating the card connector without a housing in FIG. 2A.
Figure 3B:
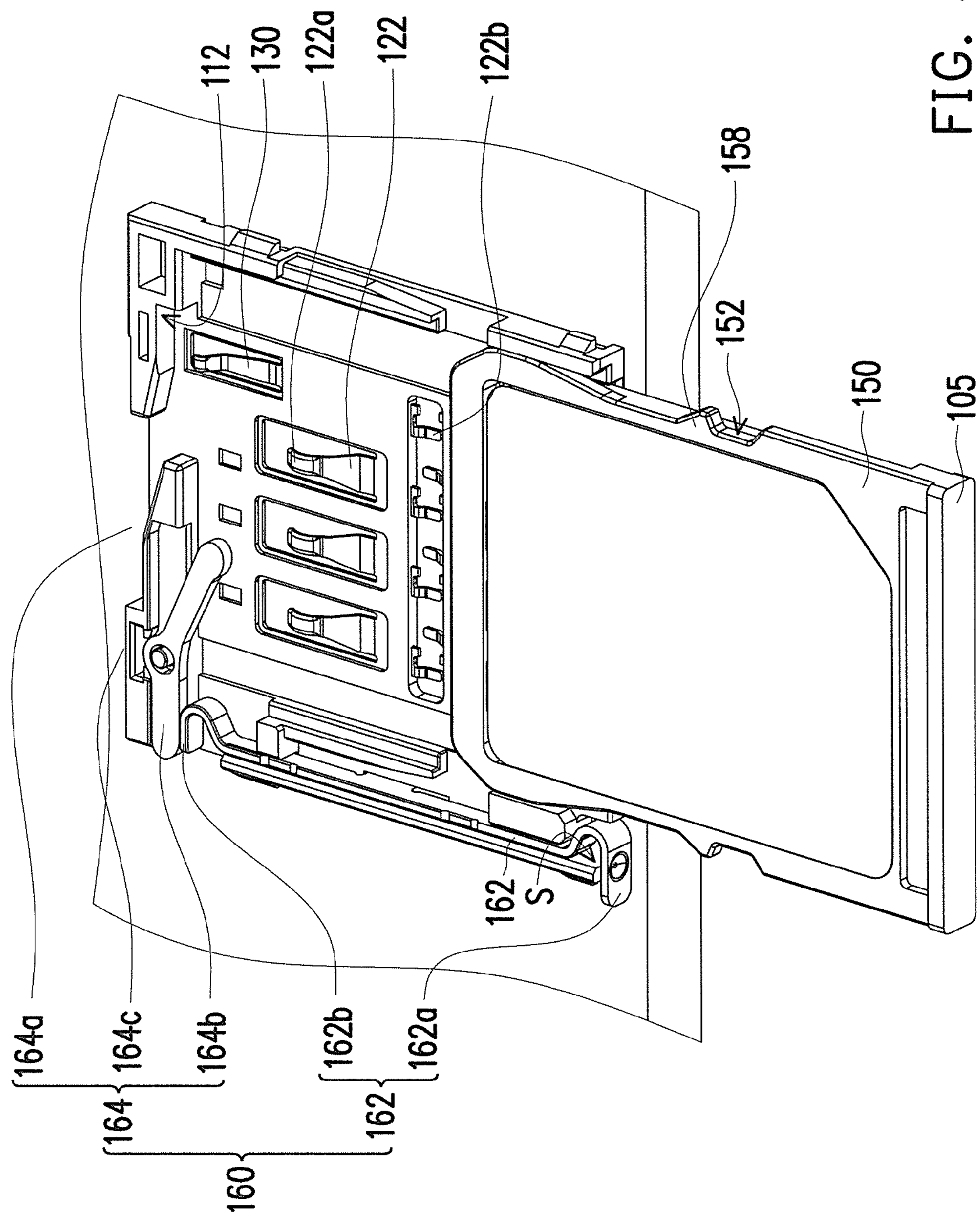

FIGS. 3A-3B are schematic views illustrating the card connector in FIG. 2A without the housing. Please refer to FIGS. 3A and 3B. In this embodiment, the card connector 100 further includes an ejecting module 160. The user can eject the tray 150 from the inside of the card connector 100 by pushing the ejecting module 160. The ejecting module 160 includes a pushing rod 162 and a rotating element 164. The pushing rod 162 is slidably configured in the side of the accommodating space S. The pushing rod 162 includes a first end 162*a* and a second end 162*b* opposing to each other, wherein the first end 162*a* is protruded out of the opening E. The rotating element 164 is configured in the accommodating space S and abuts the second end 162*b* of the pushing rod 162 as well as the tray 150. When the first end 162*a* of the pushing rod 162 moves into the accommodating space S, the second end 162*b* of the pushing rod 162 drives the rotating element 164 to rotate, thereby pushing the tray 150 to move out from the accommodating space S.

Specifically, the rotating element 164 includes a first segment 164*a*, a second segment 164*b*, and a rotating shaft 164*c*. The second end 162*b* of the pushing rod 162 abuts the second segment 164*b*; the first segment 164*a* abuts the tray 150. When the SIM card 20 is to be ejected, the first end 162*a* of the pushing rod 162 moves into the accommodating space S, allowing the rotating element 164 to rotate around the rotating shaft 164*c* such that the first segment 164*a* pushes the tray 150 to move outward. In addition, FIG. 2A shows that the housing 140 further includes an elastic arm 146. When the locking element 142 is locked to the depressed portion 152, the elastic arm 146 abuts the tray 150 and stores elastic potential energy. When the lock between the locking element 142 and the depressed portion 152 is released, the elastic arm 146 releases the elastic potential energy so as to push the tray 150. The elastic arm 146 may be in the same form as the arm portion 142*a*, such as a cantilever arm, which should not be construed as a limitation to the application.

Figure 4:
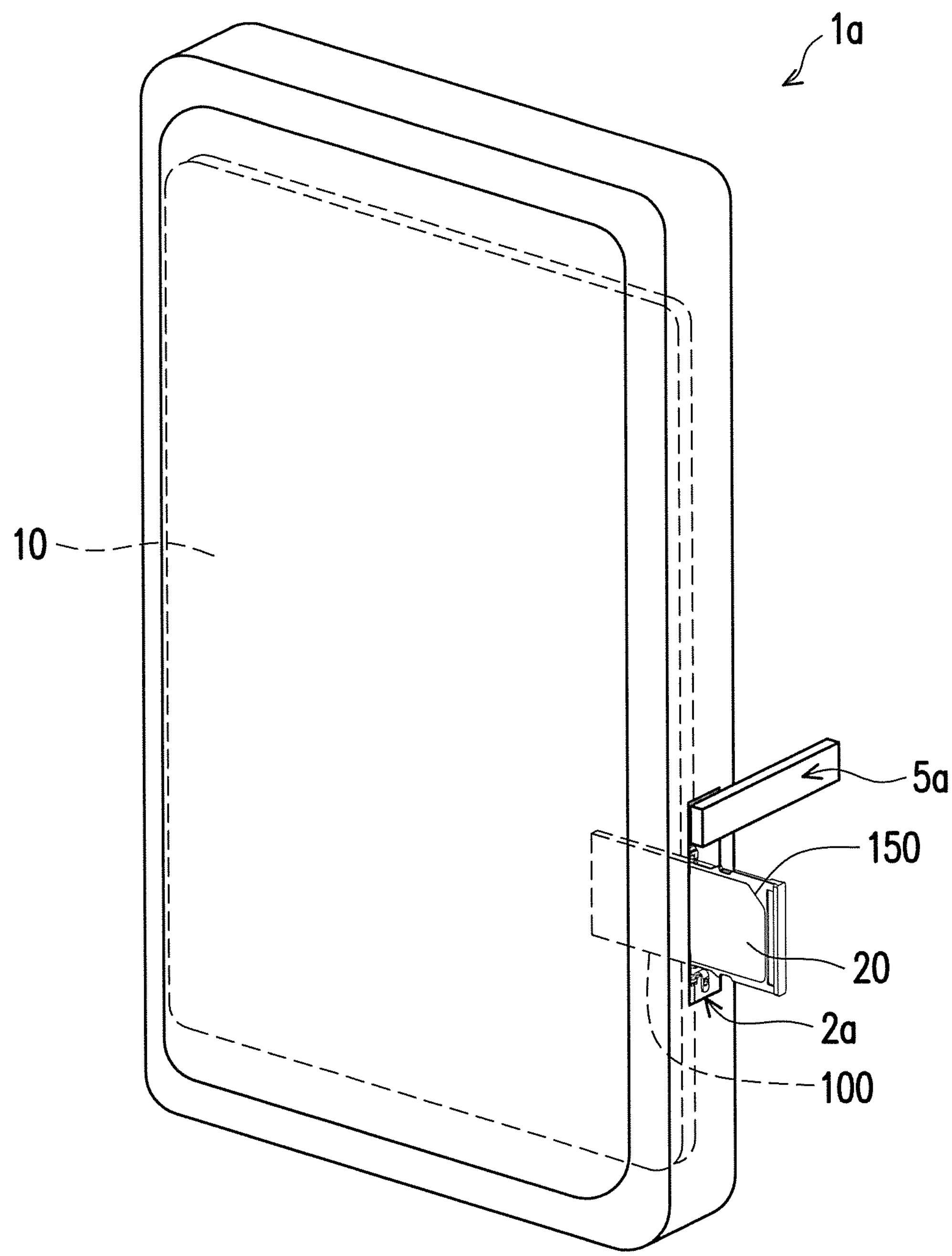
FIG. 4 is a schematic view illustrating an electronic apparatus in another embodiment of the application.

FIG. 4 is a schematic view illustrating an electronic apparatus in another embodiment of the application. Please refer to FIGS. 1A and 4. In this embodiment, an electronic apparatus 1*a* is similar to the electronic apparatus 1 in FIG. 1A, the difference being that, for example, the electronic apparatus 1*a* further includes a covering plate 5*a* independent from the card connector 100. Specifically, in FIG. 1A, a covering plate 105 of the electronic apparatus 1 is co-constructed in the tray 150; the covering plate 105 may be configured at one side of the tray 150 facing toward a connecting port aperture 2. The covering plate 105 corresponds to the connecting port aperture 2 in the electronic apparatus 1. When the tray 150 is configured in the accommodating space S via the connecting port aperture 2, the covering plate 105 aligns with the connecting port aperture 2 in the housing of the electronic apparatus 1. Relatively, in FIG. 4, a covering plate 5*a* of the electronic apparatus 1*a* is an independent component configured in the housing of the electronic apparatus 1*a*. The covering plate 5*a* may be connected to the electronic apparatus 1*a* via a fulcrum or an elastic element. The user can open the covering plate 5*a* by applying a force, thereby exposing the connecting port aperture 2 so as to configure the tray 150 in the accommodating space S.

In summary, in the present application, the sensing terminal of the card connector is electrically connected to the circuit board via the housing, and the pin of the housing is electrically connected to the circuit board. When the SIM card is placed in the tray and configured within the card connector, the tray may abut the sensing terminal, allowing the housing, tray, sensing terminal to constitute the conductive loop with the circuit board, which establishes a mechanism for detecting whether the card is configured within the card connector. Additionally, when the user wants to take the SIM card out of the card connector, the card connector may be further configured with an ejecting module. The ejecting module pushes the rotating element via the pushing rod so as to push the tray outward. Therefore, in the application, the sensing terminal directly abuts the tray to electrically connect to the circuit board. Accordingly, the problem that the accumulation of tolerance causes the sensing terminal unable to detect whether the card is configured in the card connector can be effectively reduced.

Although the application has been disclosed by the above embodiments, these embodiments are not intended to limit the application. It will be apparent to those skilled in the art that various modifications and variations can be made to the structure of the application without departing from the scope or spirit of the application. Therefore, the protecting range of the application falls in the appended claims.

What is claimed is:

1. A card connector configured on a circuit board for accommodating a subscriber identify module (SIM) card, comprising:

- a terminal set, via which the SIM card is electrically connected to the circuit board;
- a sensing terminal, electrically connected to the circuit board;
- a housing, having an opening and an accommodating space connected to the opening, the housing being electrically connected to the circuit board; and
- a tray, at least a portion of which is a conductor,
- wherein when the tray is configured in the accommodating space via the opening, the tray is electrically connected to the housing, and the tray abuts the sensing terminal, allowing the housing, the tray, the sensing terminal to constitute a conductive loop with the circuit board.

2. The card connector according to claim 1, wherein the housing and at least a portion of the tray are formed of a metal material.

3. The card connector according to claim 1, further comprising an insulating base configured on the circuit board, and the terminal set and the sensing terminal being fixed to the insulating base.

4. The card connector according to claim 1, wherein the housing further comprises at least a locking element and at least a pin, and the pin and the circuit board being electrically connected.

5. The card connector according to claim 4, wherein a side of the tray comprises at least a depressed portion, and the locking element being locked to the depressed portion so as to fix the tray.

6. An electronic apparatus, adaptable for being electrically connected to an SIM card, comprising:

- a circuit board, electrically connected to the SIM card; and a card connector, configured on the circuit board for accommodating the SIM card, comprising:

a terminal set, electrically connected to the SIM card and the circuit board;

a sensing terminal, electrically connected to the circuit board;

a housing, having an opening and an accommodating space connected to the opening, the housing being electrically connected to the circuit board; and a tray, at least a portion of the tray is a conductor, wherein when the tray is configured in the accommodating space via the opening, the tray is electrically connected to the housing, and the tray abuts the sensing tenninal, allowing the housing, the tray, the sensing terminal to constitute a conductive loop with the circuit board.

7. The electronic apparatus according to claim 6, wherein the housing and at least a portion of the tray are formed of a metal material.

8. The electronic apparatus according to claim 6, wherein the card connector further comprises an insulating base configured on the circuit board, and the terminal set and the sensing terminal are fixed to the insulating base.

9. The electronic apparatus according to claim 6, wherein the housing further comprises at least a locking element and at least a pin, the pin is electrically connected to the circuit board.

10. The electronic apparatus according to claim 9, wherein a side of the tray comprises at least a depressed portion, and the locking element being locked to the depressed portion so as to fix the tray.

* * * * *